United States Patent Office 3,030,388
Patented Apr. 17, 1962

---

3,030,388
AMINO ACID COMPOUNDS AND METHODS FOR PRODUCING THE SAME
James A. Moore, Newark, Del., and Roger D. Westland, Ann Arbor, Ernest D. Nicolaides, Grosse Pointe Farms, and John R. Dice, Grosse Pointe Woods, Mich., assignors to Parke, Davis & Company, Detroit, Mich., a corporation of Michigan
No Drawing. Filed June 23, 1958, Ser. No. 743,987
24 Claims. (Cl. 260—349)

This application is a continuation-in-part of the copending applications Serial Numbers 331,308 filed January 14, 1953, now abandoned, and 589,597, now U.S. Patent 2,996,500, filed June 6, 1956. The invention concerns new amino acid compounds related to serine, namely, O-glycyl serines and intermediate serine compounds which can be used in their production. The invention also relates to methods for producing O-glycyl serines and the mentioned intermediate serine compounds.

The O-glycyl serine products of the invention are useful as intermediates for the production of O-diazoacetyl serine which substance, particularly in its (l) and (dl) optical forms, possesses significant fungicidal properties and hence can be employed as a fungicidal ingredient of compositions intended for combatting or controlling plant diseases, particularly the disease known as tomato early blight. A suitable spray composition for the purpose comprises O-diazoacetyl-(l)-serine in aqueous solution at a concentration of 0.015 pound per 100 gallons of ultimate mixture.

In producing O-diazoacetyl serine in any of its isomeric forms the corresponding O-glycyl serine isomers are reacted with a diazotizing agent in accordance with methods which will appear hereinafter. The O-glycyl serines can be produced in various ways from the known corresponding N-carbobenzoxyserines or N-glycyl serines. The O-glycyl serines as well as the novel intermediate compounds used in the practice of the invention for their production from the aforementioned known substances can be represented in their non-salt form by the following formula, $$R-CH_2-\overset{O}{\underset{\|}{C}}-O-CH_2-CH-COOH$$
$$\underset{NH-R_1}{|}$$

where R is a halogen, azido, amino or carbobenzoxyamido group and $R_1$ is hydrogen or a carbobenzoxy group. These intermediate compounds, with the exception of those wherein R is an amino group and $R_1$ is hydrogen, form metal salts upon reaction with alkali metal or alkaline earth metal hydroxides, carbonates, bicarbonates, oxides, alkoxides, amides and the like. The intermediate compounds wherein R is an amino group also form acid addition salts with inorganic acids such as hydrochloric, hydrobromic, sulfuric, phosphoric, hydroiodic, nitric, sulfamic and the like acids.

The following diagram shows diagrammatically how the various transformations mentioned above can be carried out.

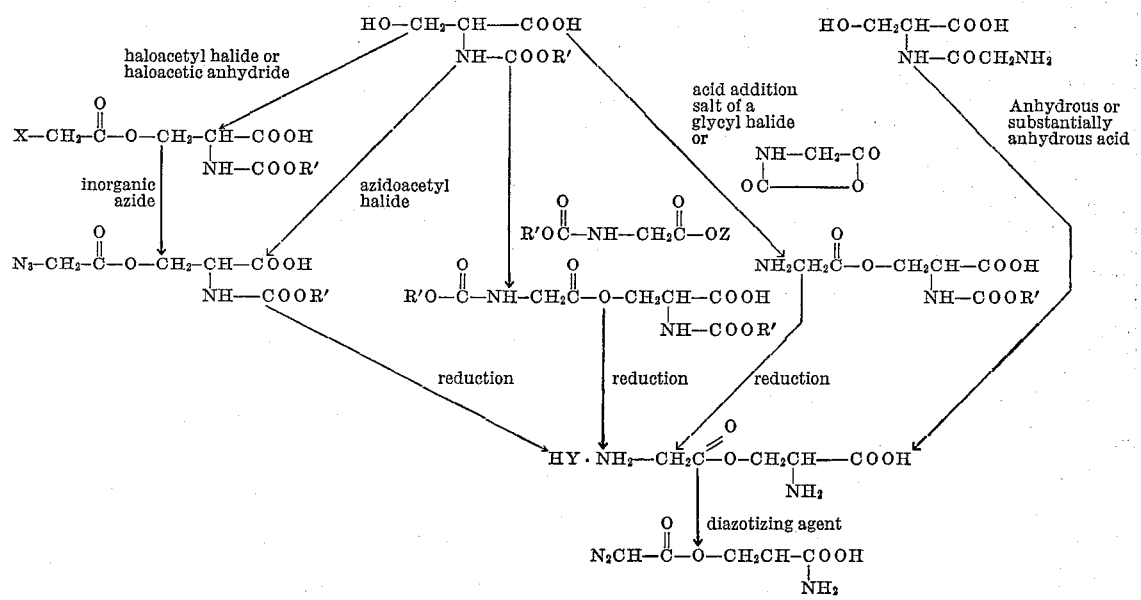

where R' is a benzyl group such as the benzyl radical itself, benzyl radicals containing ring substituents such as alkyl, alkoxy, carboxy, halogen, amino, nitro, and the like radicals, benzyl radicals substituted in the side chain with alkyl and phenyl radicals and benzyl radicals substituted in both the side chain and ring by the aforementioned substituent radicals, HY is one equivalent of a mineral acid such as hydrochloric and sulfuric acids, X is a halogen atom and Z is a portion of a mixed anhydride of an acid which includes carbonates, phosphites, arsenites, phosphates, sulfates, alkanoates and aryloates.

In carrying out the conversion of O-glycyl-(l)-serine and O-glycyl-(dl)-serine to O-diazoacetyl-(l)-serine and O-diazoacetyl-(dl)-serine, respectively, an acid addition salt of the O-glycyl serine compound is used as the starting material and the temperature of the reaction mixture kept below about 30° C. The pH of the reaction mixture should be carefully controlled in the range of 3.0 to 6.0 during the process in order to obtain satisfactory yields of the desired products. Best results are obtained when the pH of the reaction mixture is kept between 4.0 and 5.5. At a pH greater than about 6 the O-glycyl serine starting materials undergo rearrangement to the corresponding N-glycyl-serine thus materially reducing the yield of the desired product. At a pH below about 3.0 the desired O-diazoacetyl serines undergo decomposition which also lowers the yield and results in contamination of the final product. As a reaction medium water or aqueous solutions of water-miscible organic solvents such as alcohols are preferred.

In carrying out the diazotization reaction a number of different diazotizing agents can be used. For example, nitrous acid, alkyl nitrites, and nitrosyl compounds can be used. When employing nitrous acid as the diazotizing agent one can use a solution of nitrous acid (prepared by the reaction of nitrogen trioxide with water) or the nitrous acid can be generated in situ by the interaction of a mineral acid and an inorganic nitrite such as the alkali metal nitrites, alkaline earth metal nitrites and heavy metal nitrites. Some specific examples of such inorganic nitrites are sodium nitrite, potassium nitrite, barium nitrite, silver nitrite and the like. Since the O-glycyl serine compound used as the starting material is in the form of an acid addition salt it is usually preferable not to add a mineral acid to the reaction mixture but to merely allow the acid addition salt to react with the inorganic nitrite to produce the nitrous acid in situ. The nitrous acid can also be produced in situ by bubbling nitrogen trioxide through the aqueous reaction mixture or by utilizing the nitric acid salt of the O-glycyl serine and adding a reducing substance such as arsenious acid to the reaction mixture. Some examples of the alkyl nitrites which can be used as diazotizing agents are ethyl nitrite, butyl nitrite and amyl nitrite. Some examples of the nitrosyl compounds which can be used in the process are nitrosyl chloride, nitrosyl bromide and nitrosyl sulfuric acid. The quantity of diazotizing agent used in the process is not particularly critical but for reasons of economy at least one equivalent should be used for each equivalent of the O-glycyl serine starting material. Best results are obtained when an excess of the diazotizing agent is used and even though it is desired to diazotize only one of the two amino groups present in the O-glycyl serine starting material as much as three to four equivalents of the diazotizing agent can be used without deleterious effect upon the yield of the desired product.

The transformation involved in the above described diazotization reaction can be represented graphically as follows:

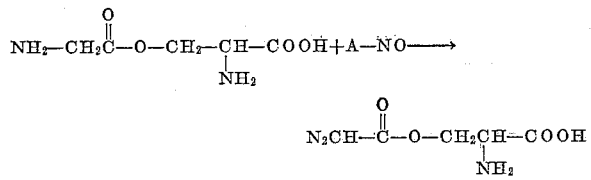

where A represents HO—, alkyl—O—, —SO₄H or halogen.

As will be apparent from the large diagram above the O-glycyl serines can, in accordance with the invention, be produced by several different methods. The method for producing the O-glycyl serine acid addition salts which will be described in detail first is the method which utilizes the N-glycyl serines as the starting material and involves the rearrangement of the glycyl radical from the amino nitrogen of the serine to the hydroxyl group. This rearrangement is brought about by treating the N-glycyl-(l)-serine or N-glycyl-(dl)-serine with a mineral acid under substantially anhydrous conditions at a temperature between 0 and 100° C. Substantially anhydrous conditions must be maintained throughout the process in order for the rearrangement to take place and at no time during the isolation procedure should the product be subjected to a pH greater than about 6.0 because at this and high pH's the product is reconverted to the starting material. The (l)-optical isomer does not undergo racemization during this rearrangement. Mineral acids such as 100% sulfuric acid, 97.5% sulfuric acid, syrupy phosphoric acid, gaseous hydrogen chloride in dioxane and gaseous hydrogen chloride in anhydrous alcohols have been found suitable for bringing about the desired transformation. The length of time required for the reaction is dependent upon the temperature, solvent and acid. At 20° C. rearrangement occurs within three to six days using 100% sulfuric acid. With hydrogen chloride in dioxane some rearrangement is obtained in one hour at 60 to 80° C. The N-glycyl-(l)-serine and N-glycyl-(dl)-serine used as starting materials in this process can be produced by the method described by Fisher et al., Ann. 375, 199 (1910) for the preparation of N-glycyl-(dl)-serine.

The other methods of the invention for producing the intermediate O-glycyl serine acid addition salts involve the use of a N-carbobenzoxy derivative of serine as the starting material. Such starting materials can be produced by the methods described in Ber. 65, 1196 (1932) and J. Biol. Chem. 146, 463 (1942) for the preparation of N-carbobenzoxy-(l)-serine and N-carbobenzoxy-(dl)-serine.

One of these methods, which utilizes as the starting material a N-carbobenzoxy derivative of serine, involves reacting the carbobenzoxy derivative with a haloacetyl halide or haloacetic anhydride to produce the corresponding O-haloacetyl-N-carbobenzoxy serine compound, reacting this halo compound with a metal azide to produce the corresponding O-azidoacetyl-N-carbobenzoxy serine compound and subjecting this latter compound to reduction thereby removing the carbobenzoxy group and also converting the azido group to an amino group.

The reaction between the haloacetyl halide or haloacetic anhydride and the N-carbobenzoxy derivative of serine is carried out in a non-hydroxylated organic solvent at a temperature below about 125° C. Some of the solvents which can be used are hydrocarbons such as benzene and toluene, aliphatic esters such as ethyl acetate, butyl acetate, ethers such as dioxane and ethyl ether, aliphatic ketones such as acetone and methyl ethyl ketone and tertiary organic amines such as those mentioned hereinafter. The reaction can be carried out in the presence or absence of a basic catalyst. The preferred basic catalysts are tertiary organic amines such as pyridine, triethylamine, quinoline, N-ethylmorpholine, triisoamylamine and the like. When a tertiary organic amine is used as a catalyst a lower reaction temperature can be employed, that is, from about 0 to 25° C. in most instances. The haloacetyl derivatives used as starting materials may be iodoacetyl, bromoacetyl or chloroacetyl compounds but, generally speaking, the bromoacetyl and chloroacetyl derivatives are preferred.

The reaction of the O-haloacetyl-N-carbobenzoxy serine compound with the metal azide to produce the corresponding O-azidoacetyl-N-carbobenzoxy serine compound can be carried out at a temperature between 15 and 100° C. but the preferred reaction temperature is between 20 and 50° C. The preferred solvents for the reaction are water, water miscible organic solvents such as lower aliphatic alcohols and dioxane and aqueous solutions of water-miscible organic solvents. Among the metal azides which can be used as starting materials are sodium azide, potassium azide, calcium azide, lithium azide and silver azide. When the O-haloacetyl-N-carbobenzoxy serine compound used as the starting material is a bromo or chloro compound it is advantageous to catalyse the reaction by adding a small amount of an inorganic iodide such as sodium iodide or potassium iodide to the reaction mixture.

The reduction of the O-azidoacetyl-N-carbobenzoxy serine compound to the corresponding O-glycyl-serine is carried out catalytically using gaseous hydrogen under pressure in the presence of a hydrogenation catalyst. The preferred hydrogenation catalysts are the noble catalysts such as palladium and platinum either as the finely divided metals, their oxides or as supported metals on inert carriers. Some examples of these noble metal catalysts are platinum, palladium, palladium on charcoal, platinic oxide, palladium on barium sulfate, platinum black and the like. Raney nickel can also be used as a catalyst but in the case where the reaction mixture contains halogen ions a large excess of the catalyst must be used. The reduction is carried out in a solvent at a pH below about 5.5. As solvents it is preferable to employ water, lower aliphatic alcohols or aqueous solutions of lower aliphatic alcohols. The temperature and hydrogen pressure can be varied widely. In general, a temperature below 100° C., preferably in the neighborhood of 20 to 35° C., is employed. Hydrogen pressures from one atmosphere to several hundred atmospheres can be used although, in general, high pressures are not necessary and satisfactory results are obtainable using a pressure between one and four atmospheres. As mentioned previously, the free bases of the O-glycyl serines are unstable at a pH above about 6 and consequently the product is isolated in the form of an acid addition salt.

The acid addition salts of the O-glycyl serines can also be produced by reacting a N-carbobezoxy derivative of serine with an azidoacetyl halide to produce the corresponding O-azidoacetyl-N-carbobenzoxy serine compound and subjecting the O-azidoaceyl-N-carbobenzoxy serine compound to reduction under acidic conditions thereby removing the carbobenzoxy group and also converting the azido group to an amino group. The reaction between the azidoacetyl halide and the N-carbobenzoxy derivative of serine is carried out in the presence of a tertiary organic amine in a non-hydroxylic solvent. As tertiary organic amines pyridine, quinoline, N-ethylmorpholine, triethylamine, triamylamine and the like can be used. Some suitable solvents for the reaction are acetone, methyl ethyl ketone, diethyl ketone, ethyl acetate, butyl acetate, dioxane and the like. The reaction is preferably carried out at a temperature below 50° C. The reaction time is dependent to a large extent on the reaction temperature. For example, the reaction is complete within one to three hours at 30 to 40° C. while about three days is required for completion at a temperature of 0 to 5° C. The O-azidoacetyl-N-carbobenzoxy serine compound so obtained can be reduced to the corresponding O-glycyl serine by the method described in the preceding paragraph.

Another method for producing the O-glycyl serine acid addition salts consists in reacting a N-carbobenzoxy derivative of serine with a mixed anhydride of carbobenzoxyglycine and subjecting the O-(N-carbobenzoxyglycyl)-N-carbobenzoxyserine compound so obtained to reduction under acidic conditions thereby removing both of the carbobenzoxy groups. Some representative examples of the mixed anhydrides of carbobenzoxyglycine which can be used in the process are carbobenzoxyglycine alkyl carbonates, carbobenzoxyglycine phenylphosphates, carbobenzoxyglycine benzyl phosphates, carbobenzoxy glycine diethyl arsenites, carbobenzoxyglycine diethyl phosphate, carbobenzoxyglycine sulfate anhydride, carbobenzoxyglycine benzoic anhydride and carbobenzoxyglycine acetic anhydride. The reaction of the mixed anhydride with the N-carbobenzoxy derivative of serine is carried out in an inert organic solvent such as a lower aliphatic ketone, lower aliphatic ether, cyclic ether or hydrocarbon at a temperature below about 50° C. in the presence of a tertiary organic amine. Some specific examples of suitable solvents are acetone, methyl ethyl ketone, diethyl ketone, diethyl ether, dioxane, benzene and toluene. As tertiary organic amines triethylamine, triisoamylamine, pyridine, quinoline, N-ethylmorpholine, N-ethylpiperidine and the like can be used. The O-(N-carbobenzoxyglycyl)-N-carbobenzoxyserine so produced can be converted by reduction to the desired acid addition salt of O-glycyl serine using the same reagents and reaction conditions as described above for the conversion of the azidoacetyl-N-carbobenzoxy serine compounds to the acid addition salts of the O-glycyl serines.

Still another method for producing O-glycyl serine acid addition salts consists in reacting a N-carbobenzoxy derivative of serine with a glycyl halide or the "Leuch's anhydride" of glycine, N-carboxyglycine anhydride, to produce the corresponding O - glycyl - N - carbobenzoxy serine compound and subjecting this latter compound to reduction under acidic conditions thereby removing the carbobenzoxy group. The reaction of the N-carbobenzoxy derivative of serine with the glycyl halide or N-carboxyglycine anhydride is carried out in a non-hydroxylic organic solvent in the presence of at least one equivalent of a mineral acid such as hydrogen chloride, hydrogen bromide, concentrated sulfuric acid and syrupy phosphoric acid. In the case of the glycyl halides which are used in the form of an acid addition salt no extra acid need be added. As solvents ketones such as acetone, diethyl ketone and methyl ethyl ketone, esters such as ethyl acetate, amyl acetate and butyl acetate and ethers such as dioxane are preferred. The temperature of the reaction can be varied from 0 to 100° C. but it is preferable to employ a temperature in the neighborhood of 30 to 60° C. The O-glycyl-N-carbobenzoxy serine compound so produced is usually isolated in the form of an acid addition salt. This compound can be converted to the desired O-glycyl serine compound using the same reagents and reaction conditions as described above for the conversion of the O-azidoacetyl-N-carbobenzoxy serine compounds to the acid addition salts of the O-glycyl serines.

The invention is illustrated by the following examples.

EXAMPLE 1

*Production of O-Diazoacetyl Serines from Acid Addition Salts of O-Glycyl Serines*

(a) 2.6 g. of sodium nitrite dissolved in 25 cc. of water is added to a solution of 2.9 g. of O-glycyl-(*l*)-serine monohydrochloride in 200 cc. of water keeping the temperature at 0° C. The solution is allowed to stand at 0–5° C. for one-half hour and then at room temperature (20 to 30° C.) for five hours. The solution is frozen and the ice sublimed from the frozen mixture under high vacuum. The tan solid so obtained is dissolved in 40 cc. of water and poured into an adsorption column containing 40 g. of activated carbon (Darco) and 40 g. of diatomaceous earth (Celite). The adsorption column is washed with water until the effluent measures approximately 400 cc. The effluent is discarded and the column washed with approximately 200 cc. of an aqueous solution containing 2% acetone. The aqueous acetone eluate is collected and evaporated to dryness in vacuo to obtain the desired O-diazoacetyl-(*l*)-serine as a pale yellow-green solid having, in aqueous solution at pH 7, an ultraviolet adsorption maximum of $$E_{1\,cm.}^{1\%} = 1164 \text{ at } 250 \text{ m}\mu$$

The product so obtained which has the formula,

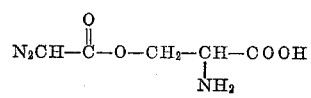

(*l*)-isomeric form is chemically pure but, if desired, it can be recrystallized from a mixture composed of pyridine, water and ethanol.

The O-glycyl-(*l*)-serine monohydrochloride used in this particular experiment was produced from N-carbobenzoxy-(*l*)-serine by the method described in Example 6(c). However, material produced by the methods described in Examples 2, 3, 4 and 5 can also be used in the above procedure with equal success.

(b) 863 mg. of sodium nitrite dissolved in 20 cc. of water is added to a solution of 990 mg. of O-glycyl-(dl)-serine monohydrochloride in 30 cc. of water keeping the temperature at about 0° C. The solution is allowed to stand for thirty minutes at 0 to 5° C., frozen and the ice sublimed from the frozen mass under high vacuum. The solid residue is dissolved in 10 cc. of water and the solution poured through an adsorption column containing 10 g. of activated carbon and 10 g. of diatomaceous earth. The column is washed with water until approximately 120 cc. of effluent has been collected. The effluent is discarded and water containing 2% acetone passed through the column until the effluent becomes colorless. The aqueous acetone eluate is frozen and the ice sublimed from the frozen mass under high vacuum to obtain the desired O-diazoacetyl-(dl)-serine. This product which has the formula,

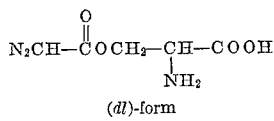
(dl)-form is purified by recrystallization from pyridine-water-ethanol mixture to give material having an ultraviolet absorption maximum of $$E_{1\,cm.}^{1\%} = 1140 \text{ at } 250.5 \text{ m}\mu \text{ and pH } 7$$

The O-glycyl-(dl)-serine monohydrochloride used in this particular experiment was produced from N-carbobenzoxy-(dl)-serine by the method described in Example 6(a). However, material produced by the methods described in Examples 2, 3, 4, and 6(b) can also be used in the above procedure with equal success.

Instead of using the monohydrochloride salt in the above procedures one can also use other acid addition salts of the O-glycyl serines. For example, the monosulfate, monohydrobromide, monohydrofluoride, monophosphate and the like mono salts can be used. The disalts of the O-glycyl serines, that is, the products in which both of the amino groups are in salt form cannot be employed in the process due to the limited pH range within which the diazotization reaction must be carried out. Thus if a di-salt is employed as the starting material it is neutralized to the mono-salt in situ when the pH of the diazotization reaction mixture is adjusted. The terms "mono-" and "di-" as used herein in chemical nomenclature refer to the number of amino groups in salt form. Thus the compound $(C_5H_{10}N_2O_4)_2 \cdot H_2SO_4$ is termed a monosulfate while the compound $C_5H_{10}N_2O_4 \cdot H_2SO_4$ is termed a disulfate.

EXAMPLE 2

*Production of O-Glycyl Serines From N-Glycyl Serines*

(a) 2.4 g. of N-glycyl-(dl)-serine is added slowly with stirring to 38 cc. of 100% sulfuric acid at 0° C. The clear solution so obtained is allowed to warm to room temperature (about 25° C.) and to stand for five days. The mixture is cooled to −30 to −40° C. and cautiously added to approximately 500 cc. of anhydrous ether at −30° C. The white solid composed of O-glycyl-(dl)-serine disulfate [$C_5H_{10}N_2O_4 \cdot H_2SO_4$] which separates is collected, washed with anhydrous ether and dried. The formula of this product is,

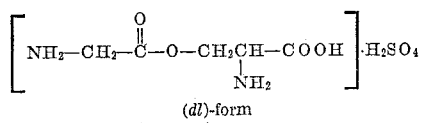
(dl)-form

This salt can be converted to the mono-sulfate by dissolving it in water and adjusting the pH of the solution to about 5 with alkali.

(b) 2.4 g. of N-glycyl-(l)-serine is added with stirring to 40 cc. of 100% sulfuric acid at 0° C. The yellow solution is allowed to stand at room temperature for four days. The solution is cooled to about −30 to −40° C. and added with stirring to about 400 cc. of anhydrous ether keeping the temperature at about −30 to −40° C. The white precipitate which forms is collected, washed with anhydrous ether and dissolved in water. The pH of the solution is adjusted to 3.5 with saturated barium hydroxide solution and the barium sulfate removed by centrifugation. The supernatant liquid is frozen and the ice sublimed from the frozen mass under high vacuum to obtain the desired monosulfate salt of O-glycyl-(l)-serine of formula,

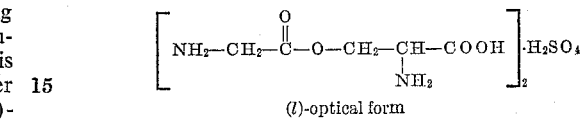
(l)-optical form as a white powder. This material is sufficiently pure for conversion to O-diazoacetyl-(l)-serine without further purification.

EXAMPLE 3

*Production of O-Glycyl Serines from N-Carbobenzoxy Serines—Method 1*

(a) 55.6 g. of bromoacetyl bromide is added slowly to a suspension of 59.8 g. of N-carbobenzoxy-(dl)-serine in 200 cc. of benzene. 75 cc. of ethyl acetate is added and the mixture warmed on the steam bath until solution is complete. The reaction mixture is then either heated for two hours at 32° C. or heated under reflux at 30 to 50 mm. of mercury pressure for two and one-half hours. The liquid is decanted from the gum which forms on the walls of the vessel and evaporated under reduced pressure until a considerable amount of white crystalline product separates. The product is collected and the evaporation procedure repeated to obtain further quantities of the product. The crude N-carbobenzoxy-O-bromoacetyl-(dl)-serine so obtained is purified by recrystallization from aqueous alcohol; M.P. 109–112° C. The formula of this product is,

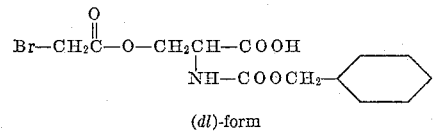
(dl)-form

If desired, the above reaction can be carried out in the presence of 23 g. of triethylamine at a temperature of about 5° C.

2.26 g. of sodium azide and just enough water to dissolve the inorganic salt are added to a solution of 5 g. of N-carbobenzoxy-O-bromoacetyl-(dl)-serine in 100 cc. of dioxane and the reaction mixture allowed to stand at 20–30° C. for three days. The solvents are removed by distillation under reduced pressure and 100 cc. of water added to the residual oil. The solution so obtained is acidified to pH 2 with hydrochloric acid which causes an oil to separate. On cooling, the oil crystallizes. The solid product is collected and purified by recrystallization from benzene; M.P. 91–2° C. This product is N-carbobenzoxy-O-azidoacetyl-(dl)-serine of formula,

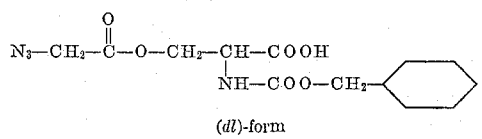
(dl)-form 4.66 cc. of (standardized) 1 N hydrochloric acid and 160 mg. of palladium black are added to a solution of 1.5 g. of N-carbobenzoxy-O-azidoacetyl-(dl)-serine in 150 cc. of 50% acetone and the resulting mixture shaken for three hours at room temperature with hydrogen under a pressure of three atmospheres. The catalyst is removed by filtration and the filtrate evaporated in vacuo to a volume of 10 to 20 cc. The residue is treated with ethanol which causes the desired O-glycyl-(dl)-serine monohydrochloride to separate from the solution. The product which has the formula,

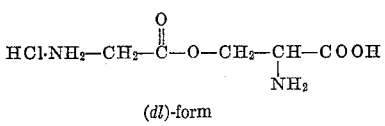

(*dl*)-form is collected and dried; M.P. 173–5° C. (dec.). If one uses an equivalent amount of hydrobromic acid in this step of the procedure the product is the monohydrobromide salt of O-glycyl-(*dl*)-serine. Similarly, the use of an equivalent of sulfuric acid yields the monosulfate salt.

(*b*) 7.9 g. of chloroacetic anhydride in 50 cc. of ethyl acetate is added to a suspension of 10 g. of N-carbobenzoxy-(*dl*)-serine in 50 cc. of ethyl acetate. Two drops of concentrated sulfuric acid are added and the reaction mixture warmed slightly for one half hour. The reaction mixture is refluxed for ten minutes and allowed to stand for about one hour. The ethyl acetate is removed by evaporation and the residue dried in vacuo. The residue is washed with petroleum ether and purified by recrystallization from benzene and aqueous ethanol; M.P. 120° C. This product is N-carbobenzoxy-O-chloroacetyl-(*dl*)-serine which has the formula,

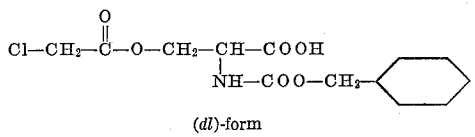

(*dl*)-form 0.762 g. of sodium azide is added to a solution of 1.85 g. of N-carbobenzoxy-O-chloroacetyl-(*dl*)-serine in 25 cc. of dioxane. Enough water (approximately 5 cc.) is added to dissolve the sodium azide and the reaction mixture allowed to stand for eight hours at 40° C. and then for sixteen hours at room temperature. The solvents are removed by distillation in vacuo and the residual oil dissolved in 100 cc. of water. The pH of the solution is adjusted to 2 with 5 N hydrochloric acid. The solution is cooled and the crystalline N-carbobenzoxy-O-azidoacetyl-(*dl*)-serine collected. Recrystallization from benzene yields the pure product; M.P. 91–2° C.

250 mg. of platinum oxide is suspended in 200 cc. of 95% ethanol and reduced by shaking with gaseous hydrogen. 2 g. of N-carbobenzoxy-O-azidoacetyl-(*dl*)-serine is dissolved in the mixture and then 6.25 cc. of 1 N hydrochloric acid added. The mixture is shaken at room temperature for three hours with hydrogen under a pressure of 2 to 4 atmospheres, the catalyst removed by filtration and the filtrate concentrated in vacuo to a volume of about 25 cc. Absolute ethanol is added to the residue which causes the desired O-glycyl-(*dl*)-serine monohydrochloride to separate in crystalline form. The product is collected and dried; M.P. 173–5° C. (dec.).

(*c*) 24 g. of bromoacetyl bromide is added to a suspension of 24 g. of N-carbobenzoxy-(*l*)-serine in 100 cc. of ethyl acetate and the mixture cooled to 0 to 5° C. 12 g. of triethylamine is added dropwise keeping the temperature at 5° C. or below and then the mixture allowed to warm slowly to room temperature. The reaction mixture is allowed to stand for one-half hour, filtered and the solvent evaporated from the filtrate. The oily residue which crystallizes on cooling consists of N-carbobenzoxy-O-bromoacetyl-(*l*)-serine, M.P. 95–7° C.; $[\alpha]_D^{26°}=+30.1°$ (4.67% in chloroform). The formula of this compound is,

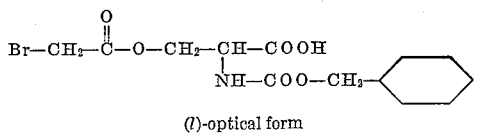

(*l*)-optical form 3.4 g. of sodium azide is added to a solution of 7.5 g. of N-carbobenzoxy-O-bromoacetyl-(*l*)-serine in 150 cc. of purified dioxane. Sufficient water is added to dissolve the inorganic salt and the reaction mixture maintained at 40° C. for six hours. The solvents are removed by distillation in vacuo and the residual oil dissolved in 150 cc. of water. An excess of dilute hydrochloric acid is added to the aqueous solution which causes the separation of a light-colored oil. Upon allowing the mixture to stand in the cold the oil crystallizes. The desired N-carbobenzoxy-O-azidoacetyl-(*l*)-serine is collected and purified by recrystallization from benzene; M.P. 82–4° C.; $[\alpha]_D^{26°}=+33.6°$ (1.9% in chloroform). The formula of this compound is,

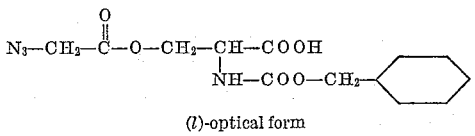

(*l*)-optical form 8.3 cc. of a standardized 1 N hydrochloric acid solution and 200 mg. of palladium black are added to a solution of 3 g. of N-carbobenzoxy-O-azidoacetyl-(*l*)-serine in 150 cc. of aqueous ethanol and the mixture shaken at room temperature with hydrogen under a pressure of 40 to 60 lbs. per sq. in. After about three hours the reaction vessel is vented and the catalyst removed by filtration. The solvents are distilled from the filtrate under reduced pressure until the volume of the residue is approximately 35 cc. Absolute ethanol is added to the residue which causes the separation of the desired product in crystalline form. This product is O-glycyl-(*l*)-serine monohydrochloride having a M.P. of 161.5° C. (dec.); $[\alpha]_D^{28°}=+10.36$ (4.5% in water). This compound has the formula,

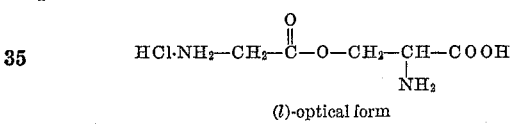

(*l*)-optical form (*d*) 7 g. of chloroacetylchloride is added to a solution of 12 g. of N-carbobenzoxy-(*l*)-serine in 50 cc. of ethyl acetate. The reaction mixture is maintained at 0–15° C. and 5 g. of anhydrous pyridine is added dropwise to the solution. The reaction mixture is allowed to stand for one hour and then the solvents are removed by distillation in vacuo. The residue is washed with water and petroleum ether and then taken up in and crystallized from benzene; M.P. 77–78.5° C.; $[\alpha]_D^{26°}=+28.8°$ (5% in chloroform). This compound is N-carbobenzoxy-O-chloroacetyl-(*l*)-serine which has the formula,

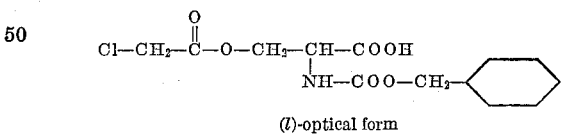

(*l*)-optical form 0.9 g. of sodium azide is added to 3 g. of N-carbobenzoxy-O-chloroacetyl-(*l*)-serine dissolved in 50 cc. of purified dioxane. Sufficient water is added to dissolve the sodium azide and the reaction mixture kept at 35–40° C. for four hours. The reaction mixture is then allowed to stand at room temperature for an additional sixteen hours and the solvents are removed under reduced pressure. The residual oil is dissolved in 50 cc. of water and the aqueous solution so obtained acidified to pH 2 with 5 N hydrochloric acid. An oil separates from the solution which crystallies upon cooling and standing. The crystalline product which consists of N-carbobenzoxy-O-azidoacetyl-(*l*)-serine is collected and purified by recrystallization from benzene; M.P. 82–4° C.; $[\alpha]_D^{26°}=+33.6°$ (1.92% in chloroform).

3.42 cc. of concentrated hydrochloric acid and 1 g. of palladium black are added to a solution of 13 g. of N-carbobenzoxy-O-azidoacetyl-(*l*)-serine dissolved in 200 cc. of aqueous ethanol. The reaction mixture is shaken at room temperature for about six hours with hydrogen under a pressure of 40–60 lbs. per sq. in. The catalyst is removed by filtration and the solvents removed by distillation in vacuo. The residual oil is taken up in water and the solution extracted with ether. The ether extract is discarded and the aqueous solution evaporated in vacuo to an oil. The residual oil is washed with ethanol which causes it to crystallize. The crystals are collected and dried. The product so obtained is O-glycyl-(*l*)-serine monohydrochloride having a M.P. of 161.5° C. (dec.); $[\alpha]_D^{28°} = +10.36$ (5% in water).

EXAMPLE 4

*Production of O-Glycyl Serines from N-Carbobenzoxy Serines—Method 2*

(*a*) 9 g. of azidoacetyl chloride is added dropwise with stirring to a solution of 10 g. of N-carbobenzoxy-(*dl*)-serine in 70 cc. of methyl ethyl ketone keeping the temperature at about 10–15° C. The reaction mixture is stirred for about two hours during which time about 3 cc. of dry pyridine is added. The solvents are removed by distillation in vacuo and the residual oil is taken up in ethyl acetate. The ethyl acetate extract is washed several times with water and then dried over anhydrous magnesium sulfate. The solution is filtered and the ethyl acetate removed by distillation. The yellow residual oil is taken up in and crystallized from benzene to obtain the desired N-carbobenzoxy-O-azidoacetyl-(*dl*)-serine; M.P. 91–2° C.

The N-carbobenzoxy-O-azidoacetyl-(*dl*)-serine prepared in accordance with the preceding paragraph is dissolved in 150 cc. of 50% ethanol. 12 cc. of 1 N hydrochloric acid and 3 g. of 1% palladium on barium sulfate are added to the solution and the mixture shaken at room temperature for four hours with hydrogen under a pressure of 30–50 lbs. per sq. in. The catalyst is removed by filtration and the solvents distilled from the filtrate under reduced pressure. The residue is stirred with alcohol which causes it to crystallize. The product so obtained is O-glycyl-(*dl*)-serine monohydrochloride; M.P. 173–5° C. (dec.).

(*b*) 9 g. of azidoacetyl chloride is added dropwise to a well-stirred solution of 10 g. of N-carbobenzoxy-(*l*)-serine in 50 cc. of acetone keeping the temperature at about 10° C. The reaction mixture is cooled to about 0–5° C. and 4 cc. of dry triethylamine is added dropwise. The reaction mixture is allowed to stand for one hour and then the acetone removed by distillation in vacuo. The residue is washed with water and the insoluble yellow oil taken up in and crystallized from benzene. The product so obtained is N-carbobenzoxy-O-azidoacetyl-(*l*)-serine; M.P. 82–4° C.

Instead of recrystallizing the crude N-carbobenzoxy-O-azidoacetyl-(*l*)-serine the product may be reduced directly to the desired acid addition salt of O-glycyl-(*l*)-serine. This may be accomplished by dissolving 3.14 g. of the above yellow oil in 75 cc. of aqueous alcohol adding one equivalent of dilute hydrochloric acid and 3 mg. of palladium black and shaking the mixture with hydrogen under a pressure of 3 to 4 atmospheres at room temperature for three hours. The reaction mixture is filtered and the solvents distilled from the filtrate in vacuo. The residue is stirred with alcohol which causes it to crystallize. The product so obtained is O-glycyl-(*l*)-serine monohydrochloride; M.P. 161.5° C. (dec.);

$[\alpha]_D^{28°} = +10.36$ (5% in water).

EXAMPLE 5

*Production of O-Glycyl Serines from N-Carbobenzoxy Serines—Method 3*

(*a*) 5.2 g. of ethyl chlorocarbonate is added to a solution of 10 g. of carbobenzoxyglycine and 5.3 g. of triethylamine in 100 cc. of anhydrous ethyl acetate. During the addition the temperature is maintained at −5° C. and then the reaction mixture allowed to stand for thirty minutes at this temperature. During the thirty minute period a white precipitate forms. A solution of 11.5 g. of N-carbobenzoxy-(*dl*)-serine and 5.3 g. of triethylamine in 100 cc. of anhydrous ethyl acetate is added to the reaction mixture and the mixture allowed to come to room temperature. The reaction mixture is finally heated at 40° C. for a period of two hours and then allowed to stand at 25° C. for an additional twelve hours. The reaction mixture is extracted with three portions of water. The aqueous solution is acidified with concentrated hydrochloric acid and precipitated oil extracted with ethyl acetate. The ethyl acetate solution is dried over anhydrous magnesium sulfate and the drying agent removed by filtration. The ethyl acetate is removed by distillation from the filtrate to obtain a viscous oil which upon standing sodifies to a hard glass. The product so obtained is O-(N-carbobenzoxyglycyl)-N-carbobenzoxy-(*dl*)-serine which has the formula,

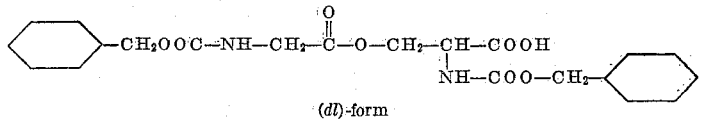

(*dl*)-form 100 mg. of palladium black catalyst is added to a solution consisting 2 g. of O-(N-carbobenzoxyglycyl)-N-carbobenzoxy-(*dl*)-serine and 4 cc. of 1 N hydrochloric acid in 50 cc. of 50% aqueous ethanol. The reaction mixture is shaken for about two hours at room temperature with hydrogen under a pressure of 30 lbs. per sq. in. The catalyst is removed by filtration and the filtrate evaporated to a small volume. Absolute ethanol is added to the residue which causes crystals of the desired O-glycyl-(*dl*)-serine monohydrochloride to separate. The crystalline product is collected and dried; M.P. 173–5° C. (dec.).

(*b*) 10.4 g. of ethyl chlorocarbonate is added to a well stirred solution of 20 g. of carbobenzoxyglycine and 10.6 g. of triethylamine in 200 cc. of anhydrous ethyl acetate keeping the temperature at −5° C. The reaction mixture is stirred for 30 minutes at −5° C. which causes the separation of a white crystalline mass. A solution of 23 g. of N-carbobenzoxy-(*l*)-serine and 10.6 g. of triethylamine in 200 cc. of dry ethyl acetate is added to the reaction mixture and the mixture allowed to warm to room temperature. The reaction mixture is then heated at 40° C. for two hours and then allowed to stand for twelve to sixteen hours at 25° C. The reaction mixture is extracted three times with water and the aqueous solution acidified with concentrated hydrochloric acid. The precipitated oil is extracted with ethyl acetate and the ethyl acetate solution dried. The drying agent is removed by filtration and the solvent removed from the filtrate by distillation in vacuo. The residual syrup so obtained solidifies upon standing to a hard glass. This product is O-(N-carbobenzoxyglycyl)-N-carbobenzoxy-(*l*)-serine which has the formula,

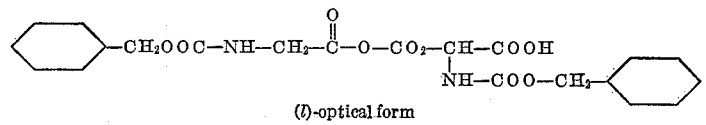

(*l*)-optical form 200 mg. of palladium black catalyst is added to a solution consisting of 4 g. of O-(N-carbobenzoxyglycyl)-N-carbobenzoxy-(l)-serine and 8 cc. of 1 N hydrochloric acid in 100 cc. of 50% aqueous ethanol. The mixture is shaken at room temperature for about two hours with hydrogen under a pressure of 30 lbs. per sq. in. The catalyst is removed by filtration and the filtrate concentrated in vacuo to a small volume. The addition of absolute ethanol to the residue causes white crystals of the desired O-glycyl-(l)-serine monohydrochloride to separate. The product is collected and dried; M.P. 161.5° C. (dec.); $[\alpha]_D^{28°} = +10.36$ (5% in water).

EXAMPLE 6

*Production of O-Glycyl Serines from N-Carbobenzoxy Serines—Method 4*

(a) 2.02 g. of N-carboxyglycine anhydride is added to a solution of 8.0 g. of N-carbobenzoxy-(dl)-serine in 15 cc. of dioxane containing 2.5 g. of hydrogen chloride. The reaction mixture is warmed to 40° C. which causes the anhydride to dissolve and a gas to be evolved. The reaction mixture is then allowed to stand at 30° C. overnight, the solution diluted with 60 cc. of water and the dioxane removed by distillation under reduced pressure. The aqueous residue is extracted with four portions of ethyl acetate and the ethyl acetate extracts discarded. The aqueous solution contains the desired O-glycyl-N-carbobenzoxy-(dl)-serine in the form of a hydrochloride salt and this compound can either be isolated or the aqueous solution used in the next step of the process. In the instance where it is desired to isolate the product one freezes the solution and sublimes the ice from the frozen mass under a high vacuum and recrystallizes the solid product from methanol; M.P. 182–184° C. The formula of this compound is,

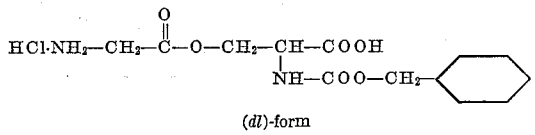

(dl)-form

The aqueous solution of O-glycyl-N-carbobenzoxy-(dl)-serine hydrochloride prepared above is shaken with hydrogen under a pressure of 40–60 lbs. per sq. in. for two and one-half hours with 200 mg. of palladium black catalyst. The catalyst is removed by filtration and the clear aqueous filtrate evaporated under reduced pressure to a clear oil. The residual oil is taken up in and crystallized from a dilute solution of methanol to obtain the desired O-glycyl-(dl)-serine monohydrochloride as a white crystalline solid; M.P. 173–175° C. (dec.).

(b) 5 g. of N-carboxyglycine anhydride is added to a suspension of 12 g. of carbobenzoxy-(dl)-serine in 100 cc. of dry ethyl acetate containing 4 g. of anhydrous hydrogen chloride. The reaction mixture is heated for twenty minutes at 60° C. and then allowed to stand at room temperature for twenty hours. The ethyl acetate is decanted from the gummy precipitate which forms during this time and the gummy residue dissolved in 50 cc. of absolute ethanol. The ethanol solution is evaporated to dryness in vacuo to obtain an oily residue. The oily residue is taken up in and crystallized from methanol to obtain the desired O-glycyl-N-carbobenzoxy-(dl)-serine monohydrochloride; M.P. 182–184° C.

600 mg. of palladium black catalyst is added to a solution of 25 g. of N-carbobenzoxy-O-glycyl-(dl)-serine monohydrochloride in 100 cc. of water and the mixture shaken at room temperature for two hours with hydrogen under a pressure of 40–60 lbs. per sq. in. The catalyst is removed by filtration and the aqueous filtrate concentrated in vacuo to a small volume. The addition of absolute ethanol to the residue causes the separation of white crystals of the desired O-glycyl-(dl)-serine monohydrochloride; M.P. 173–175° C. (dec.).

(c) 10 g. of N-carboxyglycine anhydride is added to a suspension of 25 g. of carbobenzoxy-(l)-serine in 200 cc. of anhydrous ethyl acetate containing 8 g. of dry hydrogen chloride. The reaction mixture is warmed to 60° C. for one-half hour and then allowed to stand overnight at room temperature. The ethyl acetate solution is decanted from the precipitated gum and the gum washed with dry ethyl acetate. The gummy residue is dissolved in ethanol and the solution evaporated to dryness in vacuo to obtain 22 g. of a pale yellow oil. This pale yellow oil is crude O-glycyl-N-carbobenzoxy-(l)-serine monohydrochloride. Upon recrystallization from methanol this material melts at about 155° C. (dec.). The formula of this compound is,

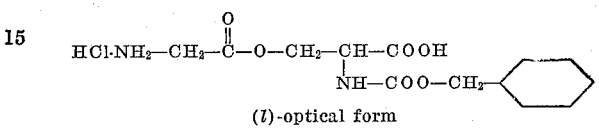

(l)-optical form 200 mg. of palladium black catalyst is added to a solution of 22 g. of O-glycyl-N-carbobenzoxy-(l)-serine monohydrochloride in 100 cc. of water and the resulting mixture shaken at room temperature for two hours with hydrogen under a pressure of 40–60 lbs. per sq. in. The catalyst is removed by filtration and the filtrate evaporated to a small volume in vacuo. The residue is washed with alcohol which causes the separation of the white crystalline solid having a melting point of 161.5° C. (dec.); $[\alpha]_D^{28°} = +10.36$ (5% in water). This product is O-glycyl-(l)-serine monohydrochloride.

What we claim is:

1. A compound having in its non-salt form the formula,

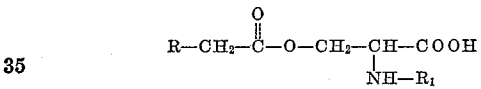

where R is a member of the class consisting of halogen, azido, amino and carbobenzoxyamido groups and $R_1$ is a member of the class consisting of hydrogen and carbobenzoxy groups.

2. A mineral acid salt of O-glycyl-(l)-serine.
3. O-glycyl-(l)-serine monohydrochloride.
4. O-glycyl-(l)-serine monosulfate having the empirical formula $[C_5H_{10}N_2O_4]_2 \cdot H_2SO_4$.
5. A mineral acid salt of O-glycyl-(dl)-serine.
6. O-glycyl-(dl)-serine monohydrochloride.
7. O-glycyl-(dl)-serine monosulfate having the empirical formula $[C_5H_{10}N_2O_4]_2 \cdot H_2SO_4$.
8. O-glycyl-(dl)-serine disulfate having the empirical formula $C_5H_{10}N_2O_4 \cdot H_2SO_4$.
9. A compound of the class consisting of N-carbobenzoxy-O-azidoacetyl-(l)-serine and N-carbobenzoxy-O-azidoacetyl-(dl)-serine and alkali metal salts and alkaline earth metal salts thereof.
10. N-carbobenzoxy-O-azidoacetyl-(l)-serine.
11. N-carbobenzoxy-O-azidoacetyl-(dl)-serine.
12. A compound of the class consisting of O-(N-carbobenzoxyglycyl)-N-carbobenzoxy-(l)-serine and O-(N-carbobenzoxyclycyl)-N-carbobenzoxy-(dl)-serine and alkali metal salts and alkaline earth metal salts thereof.
13. O - (N - carbobenzoxyglycyl) - N - carbobenzoxy - (l)-serine.
14. O - (N - carbobenzoxyglycyl) - N - carbobenzoxy - (dl)-serine.
15. Process for the production of a compound of the class consisting of mineral acid salts of O-glycyl-(l)-serine and mineral acid salts of O-glycyl-(dl)-serine which comprises treating a compound of the class consisting of N-glycyl-(l)-serine and N-glycyl-(dl)-serine with a mineral acid under substantially anhydrous conditions at a temperature between 0 and 100° C.
16. Process for the production of a compound of the class consisting of mineral acid salts of O-glycyl-(l)-serine and mineral acid salts of O-glycyl-(dl)-serine which comprises reacting an N-carbobenzoxy derivative of a compound of the class consisting of (l)-serine and (dl)-serine with an acylating agent of the class consisting of haloacetyl halides and haloacetic anhydrides in a non-hydroxylated organic solvent at a temperature below about 125° C., reacting the O-haloacetyl-N-carbobenzoxy serine compound so produced with a metal azide at a temperature between 15 and 100° C. and subjecting the O-azidoacetyl-N-carbobenzoxy serine compound so obtained to reduction in a solvent at a pH below about 5.5 with gaseous hydrogen under pressure in the presence of a hydrogenation catalyst.

17. Process for the production of a compound of the class consisting of mineral acid salts of O-glycyl-(l)-serine and mineral acid salts of O-glycyl-(dl)-serine which comprises reacting an N-carbobenzoxy derivative of a compound of the class consisting of (l)-serine and (dl)-serine with an azidoacetyl halide and subjecting the O-azidoacetyl-N-carbobenzoxy serine compound so obtained to reduction in a solvent at a pH below about 5.5 with gaseous hydrogenation under pressure in the presence of a hydrogenation catalyst.

18. Process for the production of a compound of the class consisting of mineral acid salts of O-glycyl-(l)-serine and mineral acid salts of O-glycyl-(dl)-serine which comprises reacting an N-carbobenzoxy derivative of a compound of the class consisting of (l)-serine and (dl)-serine with a compound of the class consisting of N-carboxyglycine anhydride and glycyl halides in the presence of at least one equivalent of a mineral acid in a non-hydroxylic organic solvent at a temperature between 0 and 100° C. and subjecting the O-glycyl-N-carbobenzoxy serine compound so obtained to reduction in a solvent at a pH below about 5.5 with gaseous hydrogen under pressure in the presence of a hydrogenation catalyst.

19. Process for the production of a compound of the class consisting of mineral acid salts of O-glycyl-(l)-serine and mineral acid salts of O-glycyl-(dl)-serine which comprises reacting an N-carbobenzoxy derivative of a compound of the class consisting of (l)-serine and (dl)-serine with a mixed anhydride of carbobenzoxyglycine in an inert organic solvent at a temperature below 50° C. in the presence of a tertiary organic amine and subjecting the O-(N-carbobenzoxyglycyl)-N-carbobenzoxy serine compound so obtained to reduction in a solvent at a pH below about 5.5 with gaseous hydrogen under pressure in the presence of a hydrogenation catalyst.

20. Process according to claim 15 wherein the mineral acid is sulfuric acid.

21. Process according to claim 16 wherein the acylating agent is a haloacetyl halide and the acylation is carried out in the presence of a tertiary organic amine at a temperature between 0 and 25° C. and further wherein the metal azide is an alkali metal azide and the reduction is carried out in a solvent containing hydrochloric acid in the presence of a noble metal hydrogenation catalyst.

22. Process according to claim 17 wherein the reaction with the azidoacetyl halide is carried out in a non-hydroxylic organic solvent in the presence of a tertiary organic amine at a temperature below 50° C. and further wherein the reduction is carried out in a solvent containing hydrochloric acid in the presence of a noble metal hydrogenation catalyst.

23. Process according to claim 18 wherein the N-carbobenzoxy derivative is reacted with N-carboxyglycine anhydride in the presence of at least one equivalent of hydrogen chloride at a temperature between 30 and 60° C. and further wherein the reduction is carried out in a solvent containing hydrochloric acid in the presence of a noble metal hydrogenation catalyst.

24. Process according to claim 19 wherein the mixed anhydride of carbobenzoxyglycine is N-carbobenzoxyglycine ethyl carbonate and the reduction is carried out in a solvent containing hydrochloric acid in the presence of a noble metal hydrogenation catalyst.

References Cited in the file of this patent

FOREIGN PATENTS

| | | |
|---|---|---|
| 165,623 | Australia | Oct. 17, 1955 |
| 519,968 | Belgium | May 27, 1955 |
| 519,970 | Belgium | May 27, 1955 |
| 1,088,177 | France | Sept. 8, 1954 |
| 1,088,178 | France | Sept. 8, 1954 |
| 1,098,522 | France | Mar. 9, 1955 |

OTHER REFERENCES

Geschickter: J.A.M.A., Feb. 1, 1930, pages 326–328.

Moore et al.: J. Am. Chem. Soc., vol. 76, pages 2884–91 (1954).